(12) United States Patent
Wick et al.

(10) Patent No.: US 11,488,579 B2
(45) Date of Patent: Nov. 1, 2022

(54) EVALUATING LANGUAGE MODELS USING NEGATIVE DATA

(71) Applicant: Oracle International Corporation, Redwood Shores, CA (US)

(72) Inventors: Michael Louis Wick, Lexington, MA (US); Jean-Baptiste Frederic George Tristan, Lexington, MA (US); Jason Peck, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/890,263

(22) Filed: Jun. 2, 2020

(65) Prior Publication Data

US 2021/0375262 A1 Dec. 2, 2021

(51) Int. Cl.
*G10L 15/01* (2013.01)
*G10L 15/06* (2013.01)
*G10L 15/197* (2013.01)

(52) U.S. Cl.
CPC ............ *G10L 15/01* (2013.01); *G10L 15/063* (2013.01); *G10L 15/197* (2013.01)

(58) Field of Classification Search
CPC ...... G10L 15/01; G10L 15/063; G10L 15/197
USPC ........................................................ 704/231
See application file for complete search history.

(56) References Cited

U.S. PATENT DOCUMENTS

| 5,839,106 A * | 11/1998 | Bellegarda | G10L 15/1815 |
| | | | 704/E15.024 |
| 5,873,055 A * | 2/1999 | Okunishi | G06F 40/55 |
| | | | 704/2 |
| 10,990,760 B1 * | 4/2021 | Monnett | G06F 40/295 |
| 2013/0018650 A1 * | 1/2013 | Moore | G06F 40/44 |
| | | | 704/9 |
| 2018/0329884 A1 * | 11/2018 | Xiong | G06N 3/0454 |
| 2021/0157845 A1 * | 5/2021 | Dodel | G06F 16/338 |

OTHER PUBLICATIONS

Y. Hu, X. Jing, Y. Ko and J. T. Rayz, "Misspelling Correction with Pre-trained Contextual Language Model," 2020 IEEE 19th International Conference on Cognitive Informatics & Cognitive Computing (ICCI*CC), 2020, pp. 144-149, doi: 10.1109/ICCICC50026.2020.9450253. (Year: 2020).*

(Continued)

*Primary Examiner* — Bharatkumar S Shah
(74) *Attorney, Agent, or Firm* — Kilpatrick Townsend & Stockton LLP

(57) ABSTRACT

A method of evaluating a language model using negative data may include accessing a first language model that is trained using a first training corpus, and accessing a second language model. The second language model may be configured to generate outputs that are less grammatical than outputs generated by the first language model. The method may also include training the second language model using a second training corpus, and generating output text from the second language model. The method may further include testing the first language model using the output text from the second language model.

19 Claims, 10 Drawing Sheets

(56) References Cited

OTHER PUBLICATIONS

C. Wu, C. Liu, M. Harris and L. Yu, "Sentence Correction Incorporating Relative Position and Parse Template Language Models," in IEEE Transactions on Audio, Speech, and Language Processing, vol. 18, No. 6, pp. 1170-1181, Aug. 2010, doi: 10.1109/TASL.2009.2031237. (Year: 2009).*

Y. Hu, X. Jing, Y. Ko and J. T. Rayz, "Misspelling Correction with Pre-trained Contextual Language Model," 2020 IEEE 19th International Conference on Cognitive Informatics & Cognitive Computing (ICCI*CC), 2020, pp. 144-149, doi: 10.1109/ICCICC50026.2020.9450253. (Year: 2020) (Year: 2020).*

C. Wu, C. Liu, M. Harris and L. Yu, "Sentence Correction Incorporating Relative Position and Parse Template Language Models," in IEEE Transactions on Audio, Speech, and Language Processing, vol. 18, No. 6, pp. 1170-1181, Aug. 2010, doi: 10.1109/TASL.2009.2031237. (Year: 2009) (Year: 2009).*

N. Madi and H. S. Al-Khalifa, "Grammatical Error Checking Systems: A Review of Approaches and Emerging Directions," 2018 Thirteenth International Conference on Digital Information Management (ICDIM), 2018, pp. 142-147, doi: 10.1109/ICDIM.2018.8847020. (Year: 2018).*

Y. Hu, X. Jing, Y. Ko and J. T. Rayz, "Misspelling Correction with Pre-trained Contextual Language Model," 2020 IEEE 19th International Conference on Cognitive Informatics & Cognitive Computing (ICCI*CC), 2020, pp. 144-149, doi: 10.1109/ICCICC50026.2020.9450253. (Year: 2020) (Year: 2020) (Year: 2020).*

C. Wu, C. Liu, M. Harris and L. Yu, "Sentence Correction Incorporating Relative Position and Parse Template Language Models," in IEEE Transactions on Audio, Speech, and Language Processing, vol. 18, No. 6, pp. 1170-1181, Aug. 2010, doi: 10.1109/TASL.2009.2031237. (Year: 2009) (Year: 2010) (Year: 2009).*

N. Madi and H. S. Al-Khalifa, "Grammatical Error Checking Systems: A Review of Approaches and Emerging Directions," 2018 Thirteenth International Conference on Digital Information Management (ICDIM), 2018, pp. 142-147, doi: 10.1109/ICDIM.2018.8847020. (Year: 2018) (Year: 2018).*

Karpathy, et al., "Visualizing and understanding recurrent Networks". In ICLR WS track, 2016, 11 pages.

Kovaleva, et al., "Revealing the dark secrets of BERT", In Proceedings of the 2019 Conference on Empirical Methods in Natural Language Processing and the 9th International Joint Conference on Natural Language Processing (EMNLPIJCNLP), Association for Computational Linguistics, Hong Kong, China, Nov. 2019, pp. 4365-4374.

Radford, et al., "Language models are unsupervised multitask learners", Computer Science, Mar. 2019, 24 pages.

Ravfogei, et al., "Studying the inductive biases of rnns with synthetic variations of natural languages", CoRR, abs/1903.06400, Jun. 2019, 11 pages.

Zaremba, et al., "Recurrent neural network regularization", CoRR, abs/1409.2329, Sep. 2014, 8 pages.

* cited by examiner

EVALUATING LANGUAGE MODELS USING NEGATIVE DATA

CROSS-REFERENCES TO RELATED APPLICATIONS

This application is related to U.S. patent application Ser. No. 16/890,097, titled "REMOVING UNDESIRABLE SIGNALS FROM LANGUAGE MODELS USING NEGATIVE DATA" and filed on Jun. 2, 2020. This application is incorporated herein by reference.

BACKGROUND

Language modeling is becoming a central task in natural language processing. While formal languages used in computer programming can be fully specified, this is not possible with natural language. Words and syntax can be rigidly defined in programming languages. Words, usage, and syntax in natural languages evolve over time and involve a very large number of ambiguous rules and meanings. Language modeling is the development of probabilistic models that are able to predict subsequent text based on a number of proceeding words. These language models learn their behavior by training on natural language text.

Language models may be used to evaluate tasks performed by speech recognition, character recognition, and other translations from natural language to a digital representation. For example, audio data may be used as an input to a speech recognition process. Audio data may be interpreted by a speech-recognition algorithm, and each word in the audio stream may be recognized using the language model such that it falls within the context of words that have previously been recognized. Language models may also be used to generate text in applications such as handwriting recognition, machine translation, spelling correction, autocomplete fields, image captioning, text summarization, and so forth. More powerful language models also can learn representations—sometimes called embeddings—of characters, words, phrases and sequences thereof. These representations can be used as features for downstream natural language processing tasks like named entity recognition (NER) or document classification.

Recently, the use of neural language modeling (NLM) has become the preferred model type for these applications. Neural network approaches are achieving better results than classical methods in almost every aspect. Neural language models overcome the shortcomings of traditional language models by training on increasingly large context sizes to recognize long-distance dependencies in text strings. Neural models also generalize words beyond a single instance to include parts of speech and other contexts.

Training language models requires a large corpus of positive input text. The parameters for the language models are derived such that the language model is likely to predict the strings provided within the training corpus. However, while this maximizes the ability of the language model to predict positive, grammatical, well-formed text strings, it leaves the language model susceptible to negative signals. These negative signals may be embodied in the trained language model such that they not only accurately predict positive text, but they may also be susceptible to generating relatively low perplexity scores for ungrammatical text. Therefore, improvement in the art is needed.

BRIEF SUMMARY

In some embodiments, a method for evaluating a language model using negative data may include accessing a first language model that is trained using a first training corpus and accessing a second language model. The second language model may be configured to generate outputs that are less grammatical than outputs generated by the first language model. The method may also include training the second language model using a second training corpus; generating output text from the second language model; and testing the first language model using the output text from the second language model.

In some embodiments, a non-transitory computer-readable medium may include instructions that, when executed by one or more processors, cause the one or more processors to perform operations including accessing a first language model that is trained using a first training corpus and accessing a second language model. The second language model may be configured to generate outputs that are less grammatical than outputs generated by the first language model. The operations may also include training the second language model using a second training corpus; generating output text from the second language model; and testing the first language model using the output text from the second language model.

In some embodiments, a system may include one or more processors and one or more memory devices including instructions that, when executed by the one or more processors, cause the one or more processors to perform operations including accessing a first language model that is trained using a first training corpus and accessing a second language model. The second language model may be configured to generate outputs that are less grammatical than outputs generated by the first language model. The operations may also include training the second language model using a second training corpus; generating output text from the second language model; and testing the first language model using the output text from the second language model.

In any embodiments, any or all of the following features may be implemented in any combination and without limitation. The first language model may include a target language model under test, and the second language model may include a negative language model. The second language model may include an n-gram model. The second language model may include a neural language model that is inhibited. The second language model may be inhibited such that the second language model does not consider word position. The second language model may include a transformer-based model with word-location identifiers removed. Testing the first language model using the output text from the second language model may include determining whether the first language model generates low-perplexity scores for ungrammatical inputs. The method/operations may also include testing the first language model using text that is more grammatical than the output text from the second language model. The text that is more grammatical than the output text from the second language model may include the second training corpus. The method/operations may also include comparing a perplexity score generated by the first language model using the output text from the second language model to a perplexity score generated by the first language model using the text that is more grammatical than the output text from the second language model. Testing the first language model using the output text from the second language model may include generating one or more perplexity scores generated by the first language model, and determining whether the one or more perplexity scores exceed a threshold score. The first language model may include a neural language model. The first language model comprises a transformer-based language model. The first training corpus need not include the second training corpus. The first training corpus and the second training corpus may both be subsets of a larger training corpus. The second language model may generate low-perplexity scores for ungrammatical outputs. Testing the first language model may detect whether negative signals in the first language model affect a generation of perplexity scores. The output text from the second language model may include a plurality of text sentences.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for testing trained language models using negative data. Modern language models are trained primarily using positive text from a large training corpus. Negative text may be generated by using a "negative" language model. The negative language model may be a simple or inhibited language model that is configured to generate ungrammatical outputs. For example, a tri-gram or bi-gram model may be used as the negative language model. The negative language model may be trained on a training corpus that is separate and different from a training corpus used on the target language model. The language model may then be used to generate output text. Because the output text is likely to be ungrammatical and generally not well-formed, the output text may be referred to as negative text. This negative text may then be provided as a test input to the target language model, and the response of the target language model to the negative text may be evaluated. If the target language model assigns low-perplexity scores to the negative inputs, this may reveal that the target language model is over-assigning low perplexity scores, and while it may accurately predict positive text inputs, it may also generate a form of false positives by predicting ungrammatical inputs.

Figure 1:
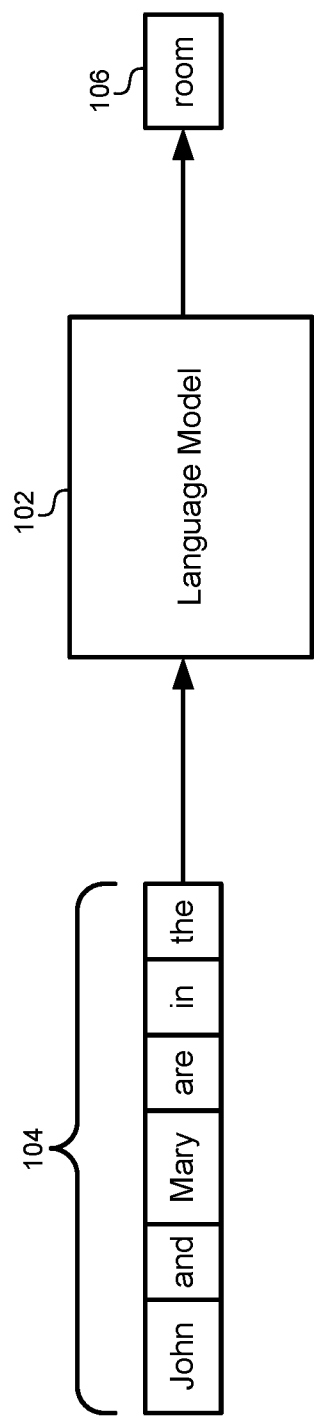
FIG. 1 illustrates an example of a language model that may be used in various applications to predict and/or score sequences of text, according to some embodiments.

FIG. 1 illustrates an example of a language model that may be used in various applications to predict and/or score sequences of text, according to some embodiments. Many applications use human languages as either inputs or outputs. While humans are trained over time to recognize grammars, language structures, meanings, and individual words, computers often learn to interpret languages using models that are trained using a corpus of human text. In short, a language model 102 may be trained to represent probabilities of text sequences occurring in natural languages based on a training corpus.

A language model 102 may operate in a number of different ways, depending on their application. FIG. 1 illustrates one mode in which a language model 102 may operate whereby the language model 102 is generative or predictive. A string of text may be provided to the language model 102, and the language model 102 may generate one or more words that it predicts will follow the input text. A text string 104 comprising a plurality of tokens representing individual words may be provided as an input to the language model 102. The language model may then output one or more tokens 106 that it predicts will follow the text string 104. In this example, the text string "John and Mary are in the . . . " is provided to the language model 102 as an input. The language model 102 may then analyze the text string 104 and predict that the next word to follow the text string will be "room" as an output token 106.

Some embodiments of a language model 102 may iteratively generate output text by appending the output token 106 of the language model 102 to the end of the input text string 104 and passing the new input text string 104 back into the language model 102. In this example, the output token 106 "room" may be appended to the end of the input text string 104 to form a new text string such as "John and Mary are in the room . . . " This new text string may then be passed as an input to the language model 102 to generate a new output token. By iteratively appending the output token 106 to the end of the input string 104, the language model 102 can be used to generate or predict output strings of any length.

Figure 2:
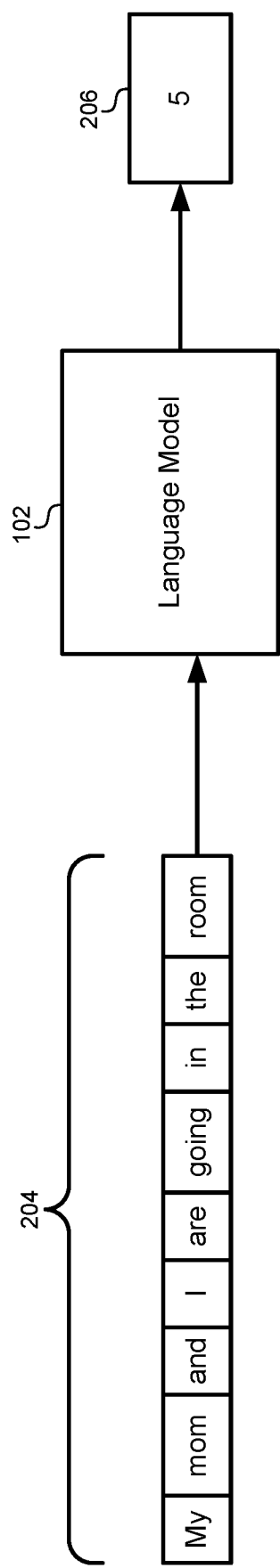
FIG. 2 illustrates how a language model may be evaluated using a perplexity measure, according to some embodiments.

FIG. 2 illustrates how a language model may be evaluated using a perplexity measure, according to some embodiments. In addition to generating or predicting output text as described above in FIG. 1, a language model 102 may also be used to characterize an input data string by generating a perplexity output. In information theory, perplexity is a measurement of how well a probabilistic language model 102 predicts a string of sample text. By providing a text string input to different language models, the perplexity measurement can be used to compare and evaluate language models against each other. Generally, a lower perplexity score indicates a better model.

A perplexity output provides a numerical characterization of how likely the language model 102 is to predict the text provided as an input. Thus, a language model should assign a higher probability to actual, grammatical, frequently observed sentences, while assigning a lower probability to nonsensical, ungrammatical, rarely observed sentences. Perplexity is an intrinsic evaluation of the language model 102. Extrinsic testing of the language model may include running an actual task such as speech recognition, optical character recognition (OCR), and so forth, and then determining whether the language model correctly performed the task in comparison to other language models. In contrast, a perplexity measurement may be used to intrinsically test a model by providing "good" or "bad" inputs and determining whether the perplexity measurement/score generated by the language model 102 is correct. For a perplexity score, minimizing perplexity is the same as increasing the probability that the language model 102 correctly predicts the input text. The best language models accurately predict unseen test sets, and thus generate perplexity scores that are lower for grammatical, well-formed inputs.

In addition to characterizing the quality of the language model 102, a perplexity output score may be used for a number of different applications as well. Speech recognition and character recognition are computerized tasks that take human voice commands or printed text strings and translate them into computer representations of words and sentences. When the speech recognition or character recognition algorithms generate an output from a voice command or printed text, ambiguities in the voice recording or the printed text characters may generate a number of possible interpretations or results. These possible results may be processed by the language model 102 to generate a perplexity measure. The possible interpretation having the lowest perplexity score may be considered the most likely to occur in a particular language. Therefore, the language model 102 may be used to choose between possible voice/text interpretations.

In the example of FIG. 2, the language model may be provided with a sample text string 204 of "My mom and I are going in the room." The sample text string 204 may be an output from a voice/text recognition program that is being tested for its likelihood of natural occurrence. The sample text string 204 may also be a test input to determine how well the language model 102 would predict the text string 204. A perplexity output 206 may be generated that characterizes the likelihood that the language model 102 would generate the sample text string 204.

Figure 3:
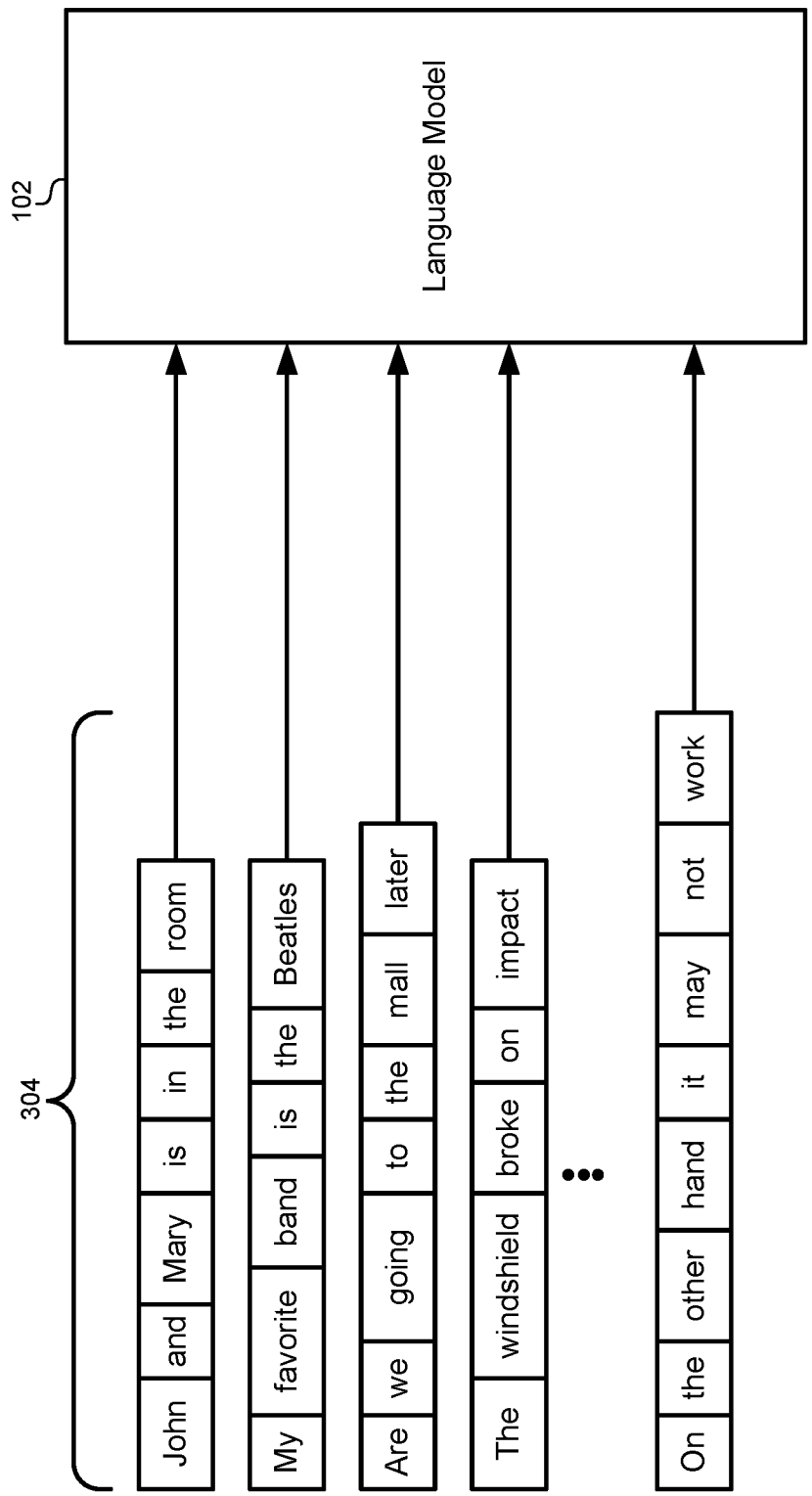
FIG. 3 illustrates a method for training a language model, according to some embodiments.

FIG. 3 illustrates a method for training a language model, according to some embodiments. The training process may begin with a training corpus 304. The training corpus 304 may be comprised of a plurality of text strings or sentences that are considered to be well-formed, grammatical, and/or regularly occurring sentences in a particular language. The training corpus 304 may be provided from any source, such as publicly available text bodies available online that are specifically designed for training language models. A large training corpus may be used to train the language model 102 for general use with, for example, the English language. A narrower training corpus may be used to train a language model 102 for a specific use. For example, some language models may use a user's email or documents to train a language model 102 that is specific to that user.

The training process for the language model 102 involves providing the training corpus 304 to a training process. The different parameters that are part of the language model 102 can be adjusted and trained using, for example, a maximum likelihood approach, such that the parameters are likely to cause the language model 102 to generate a low perplexity score for the sentences in the training corpus 304. The output of the training process is a set of model parameters that generate the outputs of the model described above in FIG. 1 and FIG. 2.

Many of today's most powerful language models are trained using relatively large text sets of well-formed sentences. This process tailors language models to generate very good perplexity scores for valid sentences that are input to the language model. However this process emphasizes the identification of "good" sentences without as much emphasis on preventing the language model 102 from inaccurately characterizing "bad" sentences with low perplexity scores as well. Current evaluation methods for language models conflate desirable and undesirable properties in the language models.

For example, consider the sentence, "Mary is in the room." A model that generates a lower perplexity score for that sentence may be considered better than a model that generates a higher perplexity score. However, by only evaluating positive grammatical examples of the language, a language model may appear to perform well by generating low perplexity scores for this type of sentence. Low perplexity scores for valid sentences may be generated by models that simply generate low perplexity scores for ungrammatical sentences as well. For example, the sentence, "John and Mary is in the room," may also generate a low perplexity score simply because the verb "is" is more common than the verb "are" in the training data, even though the verb "are" is clearly correct in this context. The co-occurrence and n-gram statistics embodied in the trained language model that stem from the verb "is" are examples of undesirable or "negative" signals that exist in current techniques for evaluating language models. A technical problem exists in this field in that existing techniques for evaluating language models are unable to detect these undesirable signals that generate a form of false positives for a language model that has a tendency to provide low perplexity scores for ungrammatical test data.

Note that this technical challenge is not limited to antiquated n-gram language models. While it should be clear that a tri-gram language model may be fooled by the "is in the room" example above, other more powerful language models are often subject to the same misclassification. For example, a neural language model with its surpassing ability to capture long-distance dependencies in a text string is still vulnerable to deleterious statistical signals up to any length. Building larger and more complex language models also does not solve this problem.

The embodiments described herein solve these and other technical problems by training a negative model using a subset of the training data used to train a target language model. The negative model may be a model known to generate ungrammatical "negative" outputs. For example, the negative model may make specific statistical assumptions that are not true about the modeled language in general, but which may be true about the training data. The negative model may then be used to predict or generate a series of output text strings. The output from the negative model may be referred to as negative data. This negative data may be useful for evaluating or training other language models. The negative data may then be applied to language models under test to characterize their performance with respect to negative input data. If the tested language models generate low perplexity scores for the negative input data, this may be an indication that the tested language models have a tendency to over-assign low perplexity scores such that good text strings are conflated with bad text strings.

Being able to identify language models that have learned undesirable statistics from training data provides a number of benefits. For example, when available language models provide enticing perplexity-based evaluations, the methods described herein may be used to make better decisions about what language models to deploy in certain situations. This may also improve the quality of the resulting word and sentence embeddings needed for downstream natural language processing tasks. For example, a digital assistant may rely heavily on language models to perform natural language processing. These methods may provide a methodology for categorizing and selecting language models that remove negative signals from their processing. These methods may also be used to detect negative signals such as gender bias or racial bias that may unintentionally be embedded in existing language models.

Figure 4:
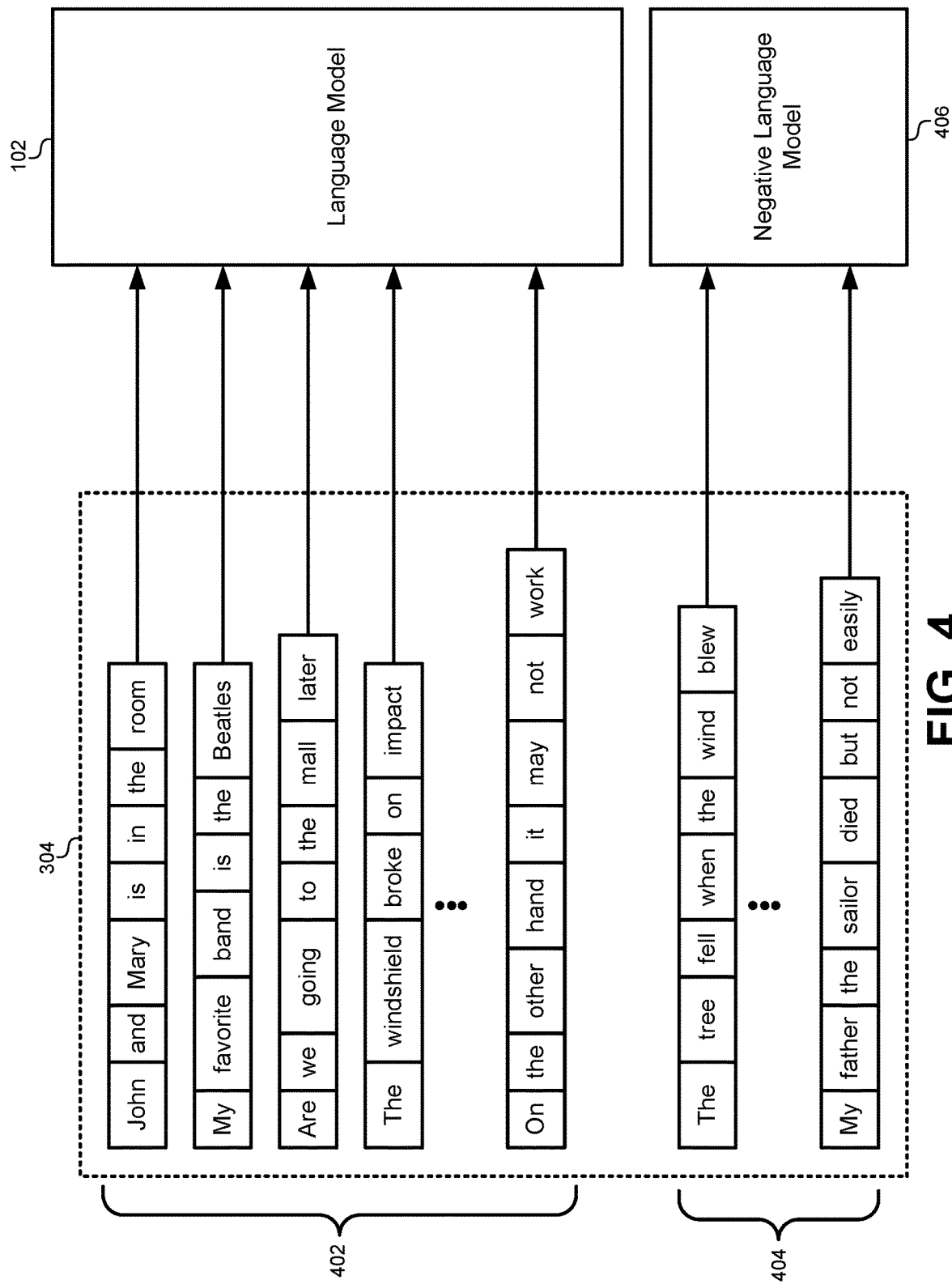
FIG. 4 illustrates a method of training a target language model and a negative language model using a training corpus, according to some embodiments.

FIG. 4 illustrates a method of training a target language model and a negative language model using a training corpus, according to some embodiments. In order to detect and attenuate undesirable signals in a language model 102, some embodiments may use an anti-modeling process. This process selects another inferior language model, referred to herein as a "negative" language model, that has a particular flaw. This flaw may be due to some incorrect assumption about the data, such as the Markov n-gram assumption or a statistical independence assumption, such that the flaw makes the model vulnerable to some inherent, but undesirable characteristic of the data. Stated another way, the model may make a specific statistical assumption that is not true about the language in general, but which is true about the data in the training corpus. For example, the negative language model 406 may use a model that assumes that the order of words in the sentence is not relevant.

Specific types of models may be used for the negative language model 406. For example, some flawed models that may be used include the N-gram family of models, including the bi-gram, tri-gram, 4-gram, etc., models that ignore order in the sentence as a whole and long-distance dependencies. Other types of models may make an independence assumption, such as the Latent Dirichlet Allocation (LDA) model, which is a topic model. Some embodiments may also use more advanced models that are inhibited in some fashion to purposefully make them perform poorly. For example, Google's Bidirectional Encoder Representations from Transformers (BERT) language model normally does not consider word order unless positional IDs are added to each of the words. By removing the position information from the BERT model, it may qualify as a negative language model 406. Similar powerful models such as transformer-based models, Long Short-Term Memory (LST) models, and/or the like may be converted into negative language models by inhibiting their performance.

Some embodiments may also classify a negative language model 406 by comparison to a language model to be tested. As described above, the negative data generated from the negative language model 406 may be used to test the performance of another language model 102 and/or to reveal any undesirable signals in the language model 102. To distinguish these two models from each other, the language model 102 to be tested may be referred to as a "target" language model or a "first" language model, while the negative language model 406 may be referred to as a "second" language model. Note that the use of the terms first/second only serves to distinguish the target language model 102 from the negative language model 406. These terms do not imply order, precedence, importance, or any other functional difference between the two language models 102, 406.

A model may also be classified as a negative language model 406 by comparison to the target language model 102. For example, some embodiments may use a negative language model 406 that has an average perplexity score on well-formed data inputs below a threshold amount. This distinguishes a negative language model 406 from a target language model 102 by their relative performance using a shared test corpus. Other embodiments may use a fully-functioning language model as the target language model 102, while inhibiting one or more features of a fully-functioning language model to be used as the negative language model 406. As described above, this may include removing position/order information from the model or disabling certain features of the model.

The target language model 102 may be any language model for which the performance is to be tested. Generally, the target language model 102 may include any modern language model that extends beyond the N-gram family of models. The target language model 102 may include any models from the neural language modeling family, such as LSTM models. The target language model 102 may also include any transformer-based models, such as Google's BERT and OpenAI's GPT2 language model. Note that these model types are provided only by way of example and are not meant to be limiting. Any model type may be used as the target language model 102.

As described above, language models may be trained by providing a training corpus 304. In order to train both the target language model 102 and the negative language model 406, the training corpus 304 may be split into two portions 402, 404. The first portion 402 of the training corpus 304 may be used to train the target language model 102. The second portion 404 of the training corpus 304 may be used to train the negative language model 406. Some embodiments may set aside the second portion 404 of the training corpus 304 such that there is not an overlap between the training data used for the target language model 102 and the negative language model 406. This ensures that both models 102, 406 have been trained using a similar type of data, while also ensuring that they are not trained using the same data.

Figure 5:
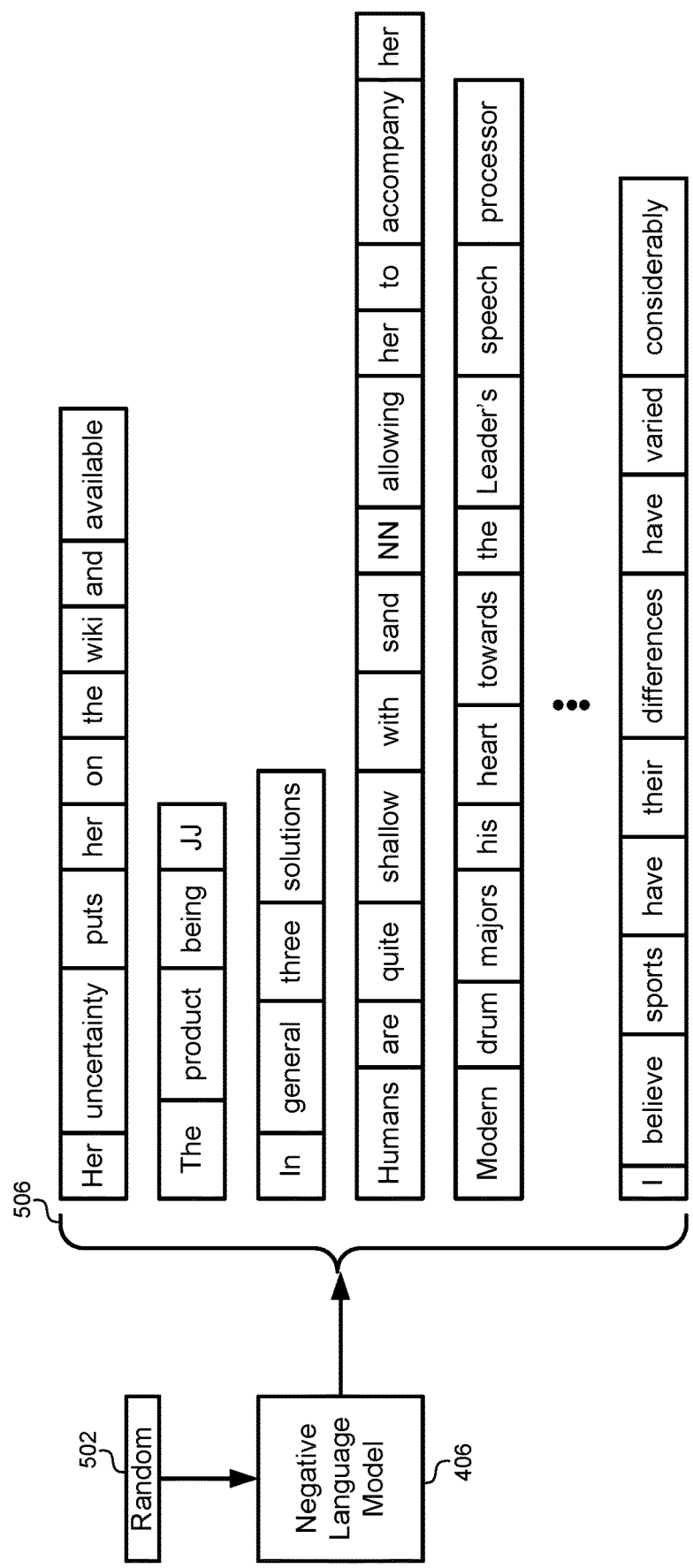
FIG. 5 illustrates how a negative language model can be used to generate test data for a target language model, according to some embodiments.

FIG. 5 illustrates how a negative language model can be used to generate test data for a target language model, according to some embodiments. As described above, language models may be used to generate or predict text based on an input. The negative language model 406 may be designed to be a predictive language model such that it can generate text in the method described above for FIG. 1 by receiving an input. For example, a random input 502 may be provided to begin generating text using the negative language model 406. This may be used to generate a long string of text or to generate a plurality of individual sentences to form an output 506 of the negative language model 406.

To generate each word of the output 506, the negative language model 406 may make a random branching decision similar to "flipping a coin" to select a next word in the output sequence according to the probabilities defined by the trained parameters of the negative language model 406. Recall that the negative language model 406 may be configured to make simplifications or statistical assumptions that are not true of the language being modeled as a whole. Therefore, even though the negative language model 406 is training using well-formed, grammatical, commonly occurring sentences, the negative language model 406 is not necessarily configured to generate well-formed, grammatical, commonly occurring sentences using its predictive output. Thus, in comparison to the target language model 102, the negative language model 406 may be characterized in that it performs worse than the target language model 102 when generating predictive outputs.

In the example of FIG. 5, the output 506 of the negative language model 406 illustrates how the negative language model 406 generates ungrammatical outputs even after being trained by grammatical inputs. For example, the negative language model 406 may be trained using a corpus that includes regular sentences, such as "When a family is able to reveal all the answers on the board before three strikes, they win the round." Another training sentence may include "The article makes no claims to notability, no famous alumni, no historical significance, and no architectural significance." Another example sentence may include "The JJ example is the VBG space of a JJ group." This last example illustrates how rare words can be replaced using their part of speech in the text. For example, "JJ" may be a placeholder for an adjective (e.g., "good"), NN may be a singular noun (e.g., "castle"), and VBG may represent a gerund (e.g., "running"). This prevents the model from being too narrowly trained using words that are unlikely to be repeated or desirable in a predicted output text.

The resulting output 506 from the negative language model 406 after being trained using sentences such as those described above may include fragments of sentences that appear grammatical, but the sentences as a whole are typically not grammatical. For example, if the negative language model 406 is based on a traditional N-gram model (e.g., a tri-gram model), then small substrings in each of the output sentences (e.g., strings of three words or less) may appear to be correct. However, when analyzed as a whole, each of the sentences is clearly not well-formed.

Figure 6:
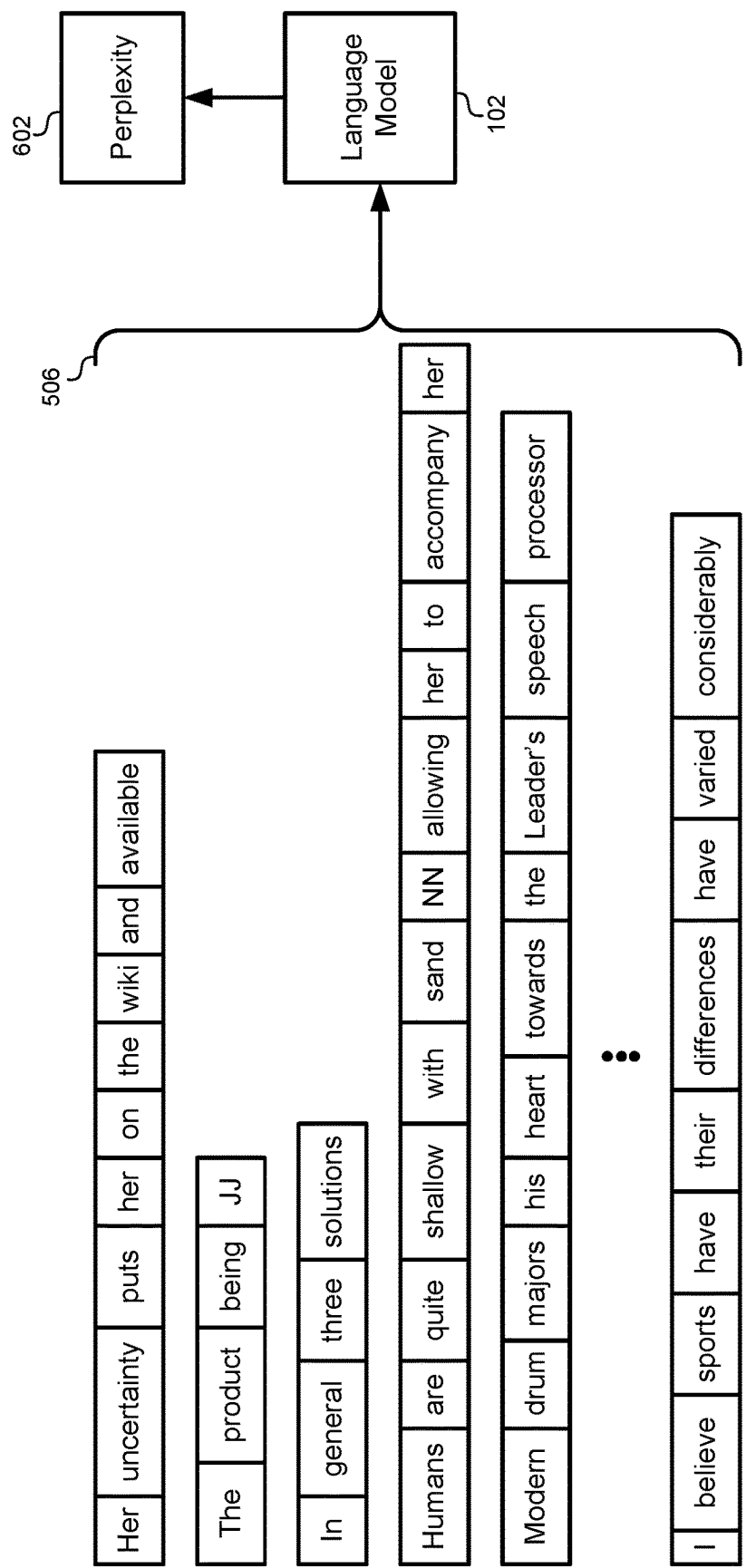
FIG. 6 illustrates how the output of a negative language model can be used to test a target model using a perplexity measure, according to some embodiments.

FIG. 6 illustrates how the output of a negative language model can be used to test a target model using a perplexity measure, according to some embodiments. The outputs 506 from the negative language model 402 described above may be used as inputs to test the target language model 102. For example, each text string or sentence in the output 506 from the negative language model 402 may be sequentially fed into the target language model 102. The target language model 102 may then generate an output perplexity score 602 indicating how likely the target language model 102 is to generate that same input.

Some embodiments may then evaluate how well the target language model 102 performs using both positive and negative data. A good language model should not only faithfully model the positive data, but it should also fail to model the negative data. That is, the best language models should generate higher probabilities (and consequently lower perplexity scores) for positive data, while also ascribing lower probabilities (and consequently higher perplexity scores) to negative data. The perplexity scores 602 for both the positive and negative data for the target language model 102 may be compared to thresholds and/or compared to each other to characterize the performance of the target language model 102. For example, some embodiments may determine whether there is a sufficient spread between the perplexity scores for the positive input data and the perplexity scores for the negative input data. An insufficient spread between these two perplexity scores may reveal that the target language model 102 is over-assigning low perplexity scores to both positive and negative data. Some embodiments may additionally or alternatively compare the perplexity scores for the positive/negative data to individual thresholds. This may be used to determine whether the positive data has a low enough perplexity score while also determining whether the negative data has a high enough perplexity score.

As a formal matter, using negative data as a tool for evaluating the target language model M may be described as follows. First, a language model family M' may be identified that is especially prone to learning some type of undesirable property from some text dataset $D'=\{x_i\}$ comprising a set of sentences (e.g., a tri-gram model). Next, that model M' may be fitted or trained to the dataset D'. Negative text data may be generated from the model M' to create a negative dataset $D'=\{x_i'\}$. The perplexity (or likelihood, or some other measure) of the model M may be evaluated on the positive data D and the negative data D'. A good model M should ideally have both low perplexity on the positive data D and high perplexity on the negative data D'.

Figure 7:
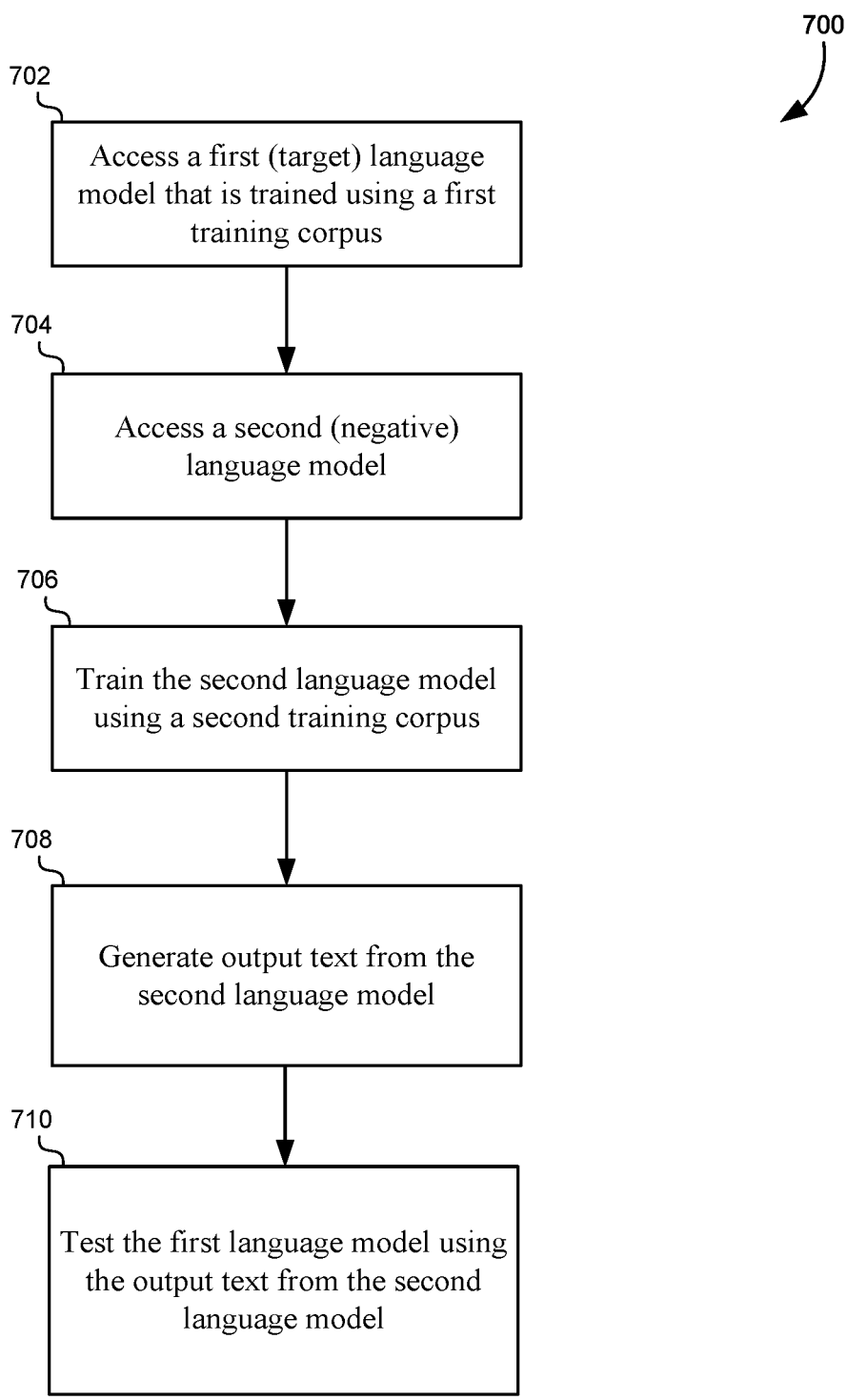
FIG. 7 illustrates a flowchart 700 of a method for evaluating a language model using negative data, according to some embodiments.

FIG. 7 illustrates a flowchart 700 of a method for evaluating a language model using negative data, according to some embodiments. The method may include accessing a first language model that is trained using a first training corpus (702). The first language model may be a target language model that is to be evaluated by this method. For example, the first language model 102 may include any language models from the neural language modeling family, such as LSTM models. The first language model 102 may include any transformer-based models, such as Google's BERT and OpenAI's GPT2 language model. The first language model may be trained using any text corpus as described above in FIG. 3 and FIG. 4.

The method may also include accessing a second language model (704). The second language model may comprise a negative language model as defined and described above. For example, the second language model may be configured to generate outputs that are less grammatical than outputs generated by the first language model. This may be accomplished in a number of different ways as described above in relation to FIG. 4. For example, the second language model may use an inferior language model, such as an n-gram-based model. The second language model may use an advanced language model that is inhibited or makes statistical assumptions that may be true of the training data set but may not be true of the language as a whole. Other examples of negative language models in comparison to target language models are provided throughout this disclosure.

The method may additionally include training the second language model using a second training corpus (706). The second training corpus may be a subset of a larger training corpus, and the first training corpus may also be a subset of the larger training corpus. The first training corpus and the second training corpus may be separate such that they do not overlap. However, the first training corpus and the second training corpus may be derived from the same larger training corpus such that they are related and the first language model and the second language model are trained in a similar fashion.

The method may further include generating output text from the second language model (708). The output text generated from the second language model may be generated using a random input to predictably generate text. As discussed above in relation to FIG. 5, the output of the second language model may be referred to as a negative output, a negative corpus, or a negative data set. Because of the inferior nature of the second language model, the output text from the second language model may be ungrammatical or not well-formed. As illustrated in FIG. 5, isolated substrings may appear to be grammatical, but overall sentences are unlikely to be grammatical in comparison to outputs that would be received from the first language model.

The method may also include testing the first language model using the output text from the second language model (710). As described above in relation to FIG. 6, the output text may be provided to the second language model, and perplexity scores may be generated for each of the input sentences in the output text. Perplexity scores may be compared to a threshold to determine whether the first language model is properly recognizing ungrammatical text and assigning a perplexity score higher than a threshold value. The first language model may also be tested using grammatical inputs along with the negative output from the negative language model. Perplexity scores generated for the positive grammatical inputs may be compared to perplexity scores generated for the negative inputs to ensure there is a sufficient spread between the two. The second training corpus for the second language model may be used as the positive test input for the first language model.

It should be appreciated that the specific steps illustrated in FIG. 7 provide particular methods of evaluating a language model using negative data according to various embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 8:
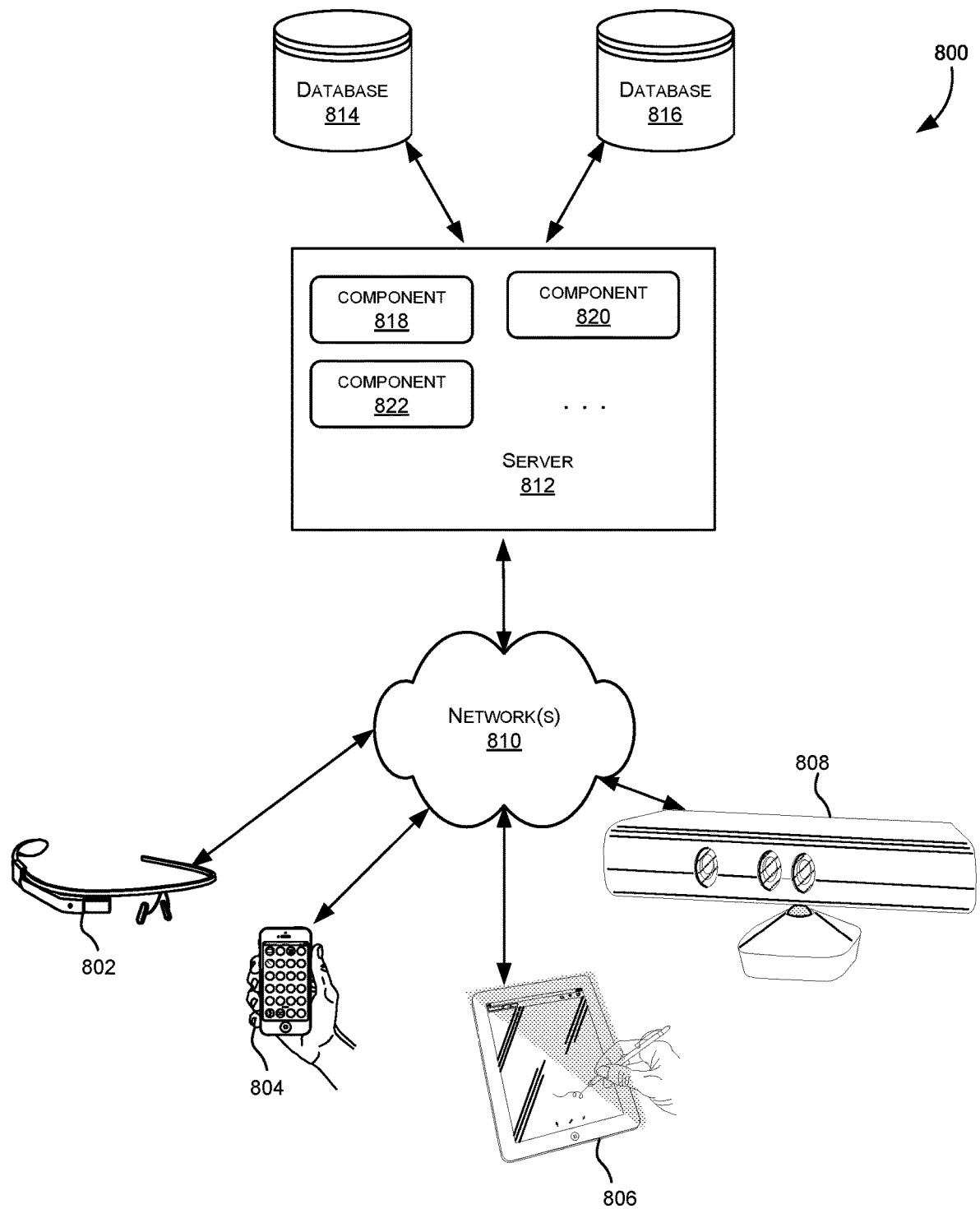
FIG. 8 illustrates a simplified block diagram of a distributed system for implementing some of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
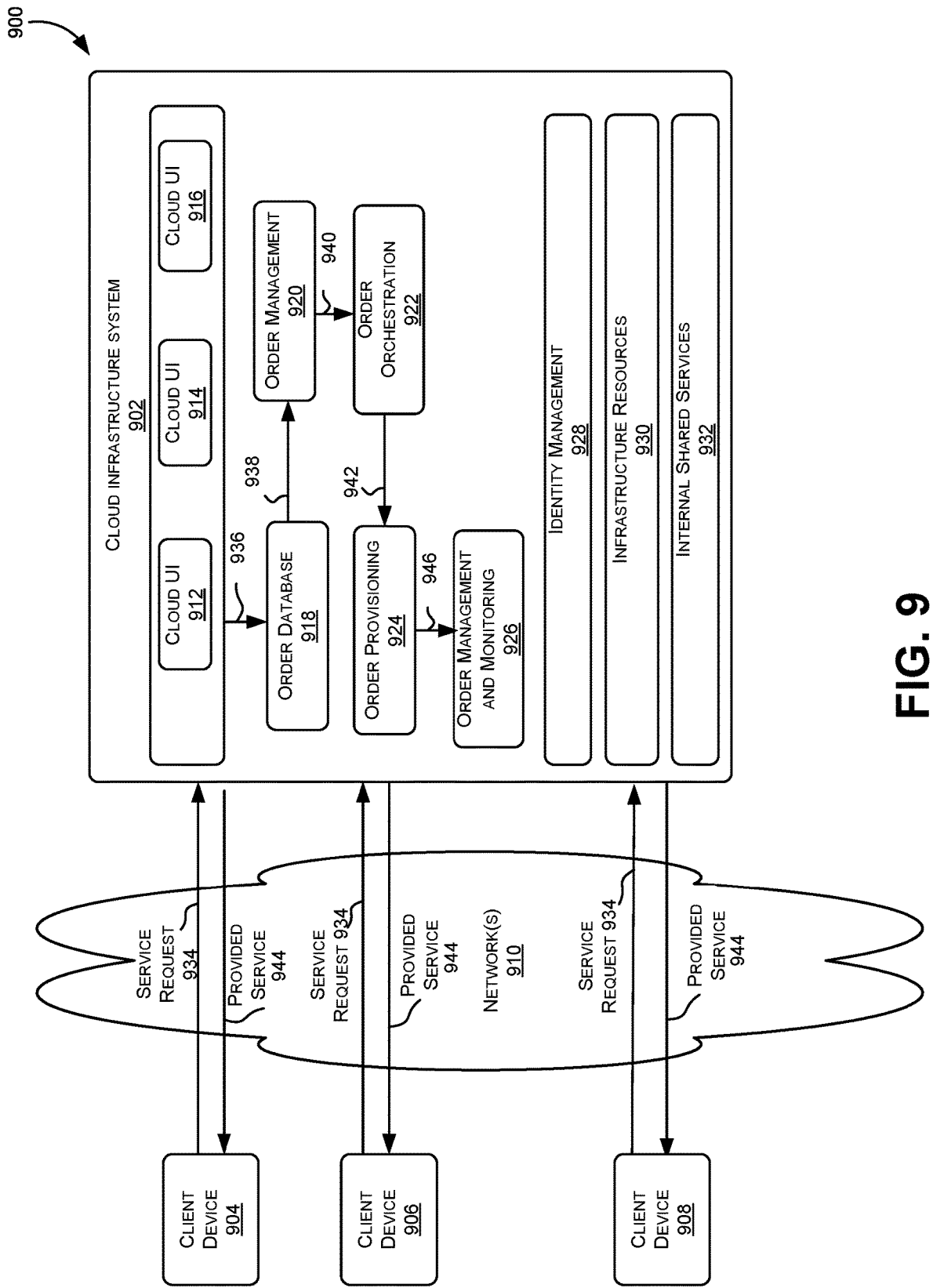
FIG. 9 illustrates a simplified block diagram of components of a system environment by which services provided by the components of an embodiment system may be offered as cloud services.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the system shown in the figure is only one example of a cloud infrastructure system that may incorporate some embodiments. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
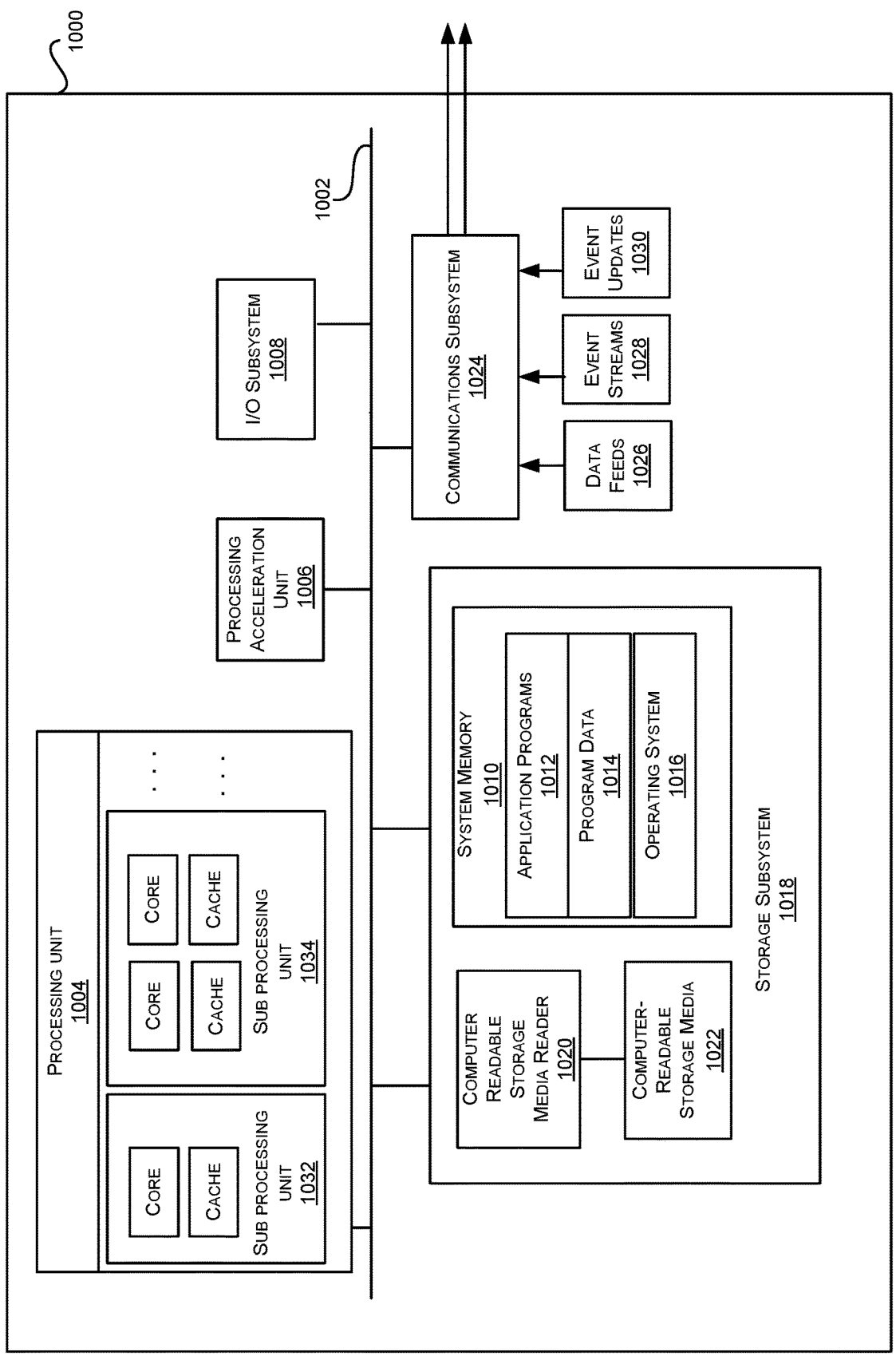
FIG. 10 illustrates an exemplary computer system, in which various embodiments may be implemented.

FIG. 10 illustrates an exemplary computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with some embodiments.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of evaluating a language model using negative data, the method comprising:
    accessing a first language model that is trained using a first training corpus;
    accessing a second language model, wherein the second language model is configured to generate outputs that are less grammatical than outputs generated by the first language model;
    training the second language model using a second training corpus;
    generating output text from the second language model; and
    testing the first language model using the output text from the second language model to generate one or more perplexity scores and determining whether the one or more perplexity scores exceed a threshold score.

2. The method of claim 1, wherein:
    the first language model comprises a target language model under test; and
    the second language model comprises a negative language model.

3. The method of claim 1, wherein the second language model comprises an n-gram model.

4. The method of claim 1, wherein the second language model comprises a neural language model that is inhibited.

5. The method of claim 1, wherein the second language model is inhibited such that the second language model does not consider word position.

6. The method of claim 1, wherein the second language model comprises a transformer-based model with word-location identifiers removed.

7. The method of claim 1, wherein testing the first language model using the output text from the second language model comprises determining whether the first language model generates low-perplexity scores for ungrammatical inputs.

8. A non-transitory computer-readable medium comprising instructions that, when executed by one or more processors, cause the one or more processors to perform operations comprising:
    accessing a first language model that is trained using a first training corpus;
    accessing a second language model, wherein the second language model is configured to generate outputs that are less grammatical than outputs generated by the first language model;
    training the second language model using a second training corpus;
    generating output text from the second language model; and
    testing the first language model using the output text from the second language model to generate one or more perplexity scores and determining whether the one or more perplexity scores exceed a threshold score.

9. The non-transitory computer-readable medium of claim 8, wherein the operations further comprise testing the first language model using text that is more grammatical than the output text from the second language model.

10. The non-transitory computer-readable medium of claim 9, wherein the text that is more grammatical than the output text from the second language model comprises the second training corpus.

11. The non-transitory computer-readable medium of claim 9, wherein the operations further comprise comparing a perplexity score generated by the first language model using the output text from the second language model to a perplexity score generated by the first language model using the text that is more grammatical than the output text from the second language model.

12. The non-transitory computer-readable medium of claim 8, wherein the first language model comprises a neural language model.

13. The non-transitory computer-readable medium of claim 8, wherein the first language model comprises a transformer-based language model.

14. A system comprising:
    one or more processors; and
    one or more memory devices comprising instructions that, when executed by the one or more processors, cause the one or more processors to perform operations comprising:
        accessing a first language model that is trained using a first training corpus;
        accessing a second language model, wherein the second language model is configured to generate outputs that are less grammatical than outputs generated by the first language model;
        training the second language model using a second training corpus;
        generating output text from the second language model; and
        testing the first language model using the output text from the second language model to generate one or more perplexity scores and determining whether the one or more perplexity scores exceed a threshold score.

15. The system of claim 14, wherein the first training corpus does not include the second training corpus.

16. The system of claim 14, wherein the first training corpus and the second training corpus are both subsets of a larger training corpus.

17. The system of claim 14, wherein the second language model generates low-perplexity scores for ungrammatical outputs.

18. The system of claim 14, wherein testing the first language model detects whether negative signals in the first language model affect a generation of perplexity scores.

19. The system of claim 14, wherein the output text from the second language model comprises a plurality of text sentences.

* * * * *